Patented Nov. 18, 1924.

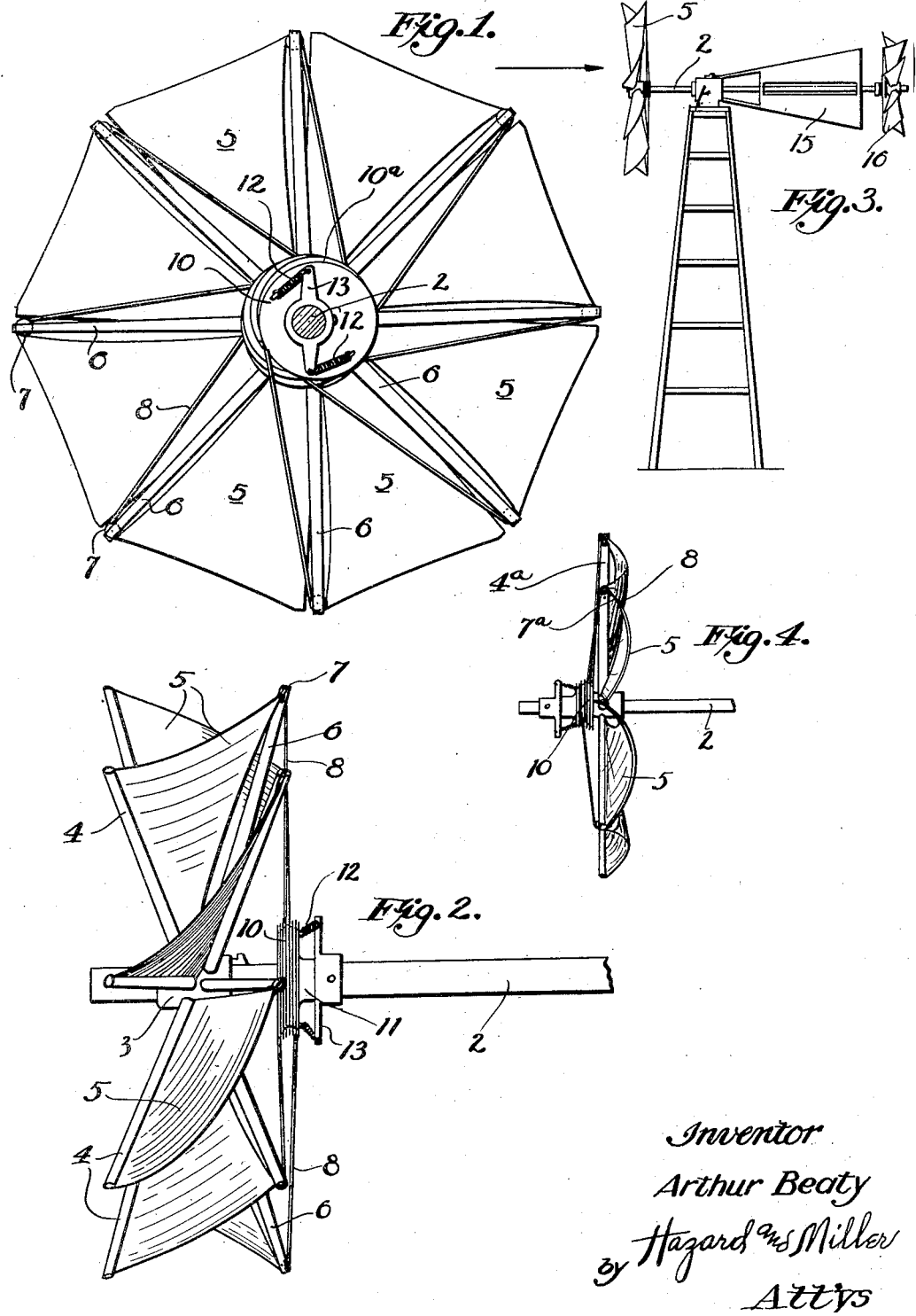

1,516,472

UNITED STATES PATENT OFFICE.

ARTHUR BEATY, OF ALHAMBRA, CALIFORNIA.

WINDMILL.

Application filed March 2, 1923. Serial No. 622,312.

*To all whom it may concern:*

Be it known that I, ARTHUR BEATY, a citizen of the United States, residing at Alhambra, in the county of Los Angeles and State of California, have invented new and useful Improvements in Windmills, of which the following is a specification.

This invention relates to windmills, and has for its object to provide a substantial windmill structure including a driving member having a set of radially extending arms symmetrically arranged and to which are connected respective flexible impelling receiving means consisting of sails or wings. Another object is to provide means for automatically slacking up the sails as the pressure of the wind increases above a predetermined degree, and to provide means for automatically again tensioning the wings or sails as wind pressure may fall, thereby to obtain a construction which is self compensating in proportion to the degree of pressure, and will be self-protecting against destruction owing to the velocity of wind.

Other objects and advantages will be made manifest in the following specification of embodiments of the invention illustrated in the accompanying drawings, wherein—

Figure 1 is an elevation of the windmill wheel showing in cross section the power shaft.

Fig. 2 is a side elevation of the windmill of Fig. 1 and a portion of its shaft.

Fig. 3 is an elevation of a windmill with its derrick and wind vane or tail.

Fig. 4 is a side elevation of a slightly modified form of the wind wheel.

The windmill of the present construction includes a substantial power shaft 2 upon which is fixed a wheel hub 3 from which projects radially a set of masts or spokes 4, and in the preferred form as shown in Figs. 1 and 2, these masts or spokes each tilt forwardly into the wind and have each a rearwardly extending substantially triangular flexible sail or wing 5, one edge of each wing being secured along its respective mast 4, while the top and rear edge project rearwardly and are connected to suitable control means whereby the sails will be automatically slacked up so as to come closer into the eye of the wind, or in other words reduce the area presented directly to wind force and permit the passage of the wind between the several sails to prevent the sails from being mutilated or blown away.

In Figs. 1 and 2 there is provided a rear set of rearwardly inclined spokes 6, and these may be arranged in position opposite the front forwardly inclined masts 4. In the upper end of each of the rear spokes 6 is a guide device, such as a pulley 7 and over this runs a sail controlling rope 8 which is attached to the contiguous outer rear upper corner of a respective sail, these sails being arranged so as to extend, when set tight, diagonally from a forwardly inclined mast 4 to a diagonally opposite rear spoke 6. Means are provided for automatically tightening up the sail rope 8 and thus holding the sails 5 in taut diagonal position under a predetermined degree and for releasing the sails as the wind increases above this pressure.

Such automatic sail setting and sail releasing means includes a pulley device 10 having a hub 11 rotatively mounted on the power shaft 2, and this hub and device is yieldingly connected to the shaft as by springs 12 which may be attached to arms 13 fixed on the shaft 2. The sail ropes 8 are each connected to the pulley device 10 and run off tangentially from the device. It will be seen, therefore, that the springs 12 serve to turn the pulley device 10 in one direction in opposition to the tendency of the pull of the sails 5 on the ropes 8. In the event that the wind pressure increases unduly, the tension of the ropes which are attached to the pulley device, will be to rotate the same on the shaft against the tension of the springs with the result that the sail ropes will be payed out and the sails slacked up to offer less resistance.

A preferred form of the pulley device is shown in Figs. 1 and 2 in which the pulley is provided with cam or eccentric faces $10^a$, one for each sail rope 8, and the sail ropes extend tangentially from the minor radius of the eccentric portion $10^a$ in the normal full set positions of the sails. As wind pressure increases the tension on the ropes 8 operates to turn the pulley device 10, as above explained, and in order to increase the leverage of the ropes on the pulley device against the increasing tension of the springs 12, it will be seen that the rotation of the eccentric faces $10^a$ in direction of the pull with the ropes provides for an increase of leverage of the ropes as the eccentric portion rotates.

A somewhat modified form of the invention is shown in Fig. 4 wherein the masts 4ª are all arranged in a common plane perpendicular to the axis of the shaft 2 and the outer end of each mast is provided with a pulley or other suitable guide device 7ª over which passes the respective sail rope 8 connected to a respective sail 5. In this form the top edge of each sail is provided with a stiffening rope 8ª to which the respective sail rope 8 is attached. The several ropes extend to the pulley device 10 as above described after passing over the pulleys 7ª. It will be seen that in this form of the device the rear spoke elements 6 are eliminated and the mast of one sail serves as a support for the sail rope pulley 7ª of the next contiguous sail. The windmill is provided with a suitable wind vane or tail 15 so connected to the main shaft as to hold the wind wheel structure up into the wind and, if desired, the shaft 2 may be provided on its rearwardly extending end with a smaller supplemental wind wheel 16 which in itself will have a leverage acting on the shaft to hold the main wheel up in the wind.

It is understood that the power produced by the wind upon the wheel may be utilized in any suitable manner and in the operation of any suitable apparatus.

Further embodiments, modifications and variations may be resorted to within the spirit of the invention as here claimed.

What is claimed is:

1. A windmill wheel comprising, in combination, a main power shaft, a wheel hub secured thereon and having a plurality of radially extending spoke-like masts, a sail connected to each mast, sail ropes for the sails, and means yieldingly mounted on the shaft and to which the ropes are attached for automatically maintaining the sails in tensioned condition under varying pressure of wind on the sails.

2. A windmill wheel comprising, in combination, a main power shaft, a wheel hub secured thereon and having a plurality of radially extending spoke-like masts, a sail connected to each mast, sail ropes for the sails, and means yieldingly mounted on the shaft and to which the ropes are attached and whereby the sails are automatically maintained in tensioned condition, said means including a pulley device rotative on the shaft and to which the sail ropes are connected so as to be wound and unwound according to the pressure of the wind on the sails.

3. A windmill wheel comprising, in combination, a main power shaft, a wheel hub secured thereon and having a plurality of radially extending spoke-like masts, a sail connected to each mast, sail ropes for the sails, and means yieldingly mounted on the shaft and to which the ropes are attached and whereby the sails are automatically maintained in tensioned condition, said means including a spring controlled pulley device having eccentric pulley-like faces to each of which respective ropes are connected to be payed off tangentially.

4. A windmill wheel comprising, in combination, a main power shaft, a wheel hub secured thereon and having a plurality of radially extending spoke-like masts, a sail connected to each mast, sail ropes for the sails, and means yieldingly mounted on the shaft and to which the ropes are attached and whereby the sails are automatically maintained in tensioned condition, said means including a spring controlled pulley device having eccentric pulley-like faces to each of which respective ropes are connected to be payed off tangentially, and whereby the leverage of the sail ropes on the pulley is increased as the resistance of the springs controlling the pulley increases.

In testimony whereof I have signed my name to this specification.

ARTHUR BEATY.